United States Patent [19]

Khurgin

[11] 4,173,892
[45] Nov. 13, 1979

[54] APPARATUS FOR MEASUREMENT OF QUANTITY OF LIQUID IN CONTAINER

[76] Inventor: Boris Khurgin, 14 David Marcus, Haifa, Israel

[21] Appl. No.: 903,617

[22] Filed: May 8, 1978

[30] Foreign Application Priority Data

Nov. 20, 1977 [IL] Israel .................................. 53430

[51] Int. Cl.² .......................................... G01F 23/26
[52] U.S. Cl. .................................. 73/304 C; 361/284
[58] Field of Search .................... 73/304 C; 361/284

[56] References Cited

U.S. PATENT DOCUMENTS

| | | | |
|---|---|---|---|
| Re. 27,829 | 12/1973 | Tiffany | 73/304 C |
| 2,936,411 | 5/1960 | Doty | 361/284 |
| 3,939,360 | 2/1976 | Jackson | 73/304 C |

FOREIGN PATENT DOCUMENTS 7503179  9/1976  Netherlands ................... 73/304 C

*Primary Examiner*—S. Clement Swisher
*Attorney, Agent, or Firm*—James & Franklin

[57] ABSTRACT

Apparatus is provided for generating a signal proportional to the quantity of a substance in a container composed of electrically non-conducting material. The container is converted into an electrical condensor by mounting a pair of electrically isolated electrodes on the outside of the container in face-to-face relationship on opposite sections thereof, such that the substance to be measured is situated therebetween. The electrodes are connected to an electronic capacitance measuring unit, preferably including a charge pump frequency to voltage converter, which senses a capacitance of the electrodes and generates an output signal proportional to the sensed capacitance. In this manner, an instantaneous measurement of the quantity of the substance in the container can be obtained and recorded. The measuring unit can be calibrated such that its output is linearly proportional to the quantity of the substance to be measured. Through the use of this apparatus, accurate measurements can be obtained without contamination of the substance. The apparatus is particularly suited for the automatic daily measurement of the milk yield of cows on a dairy farm.

15 Claims, 3 Drawing Figures

U.S. Patent  Nov. 13, 1979  Sheet 1 of 2  4,173,892
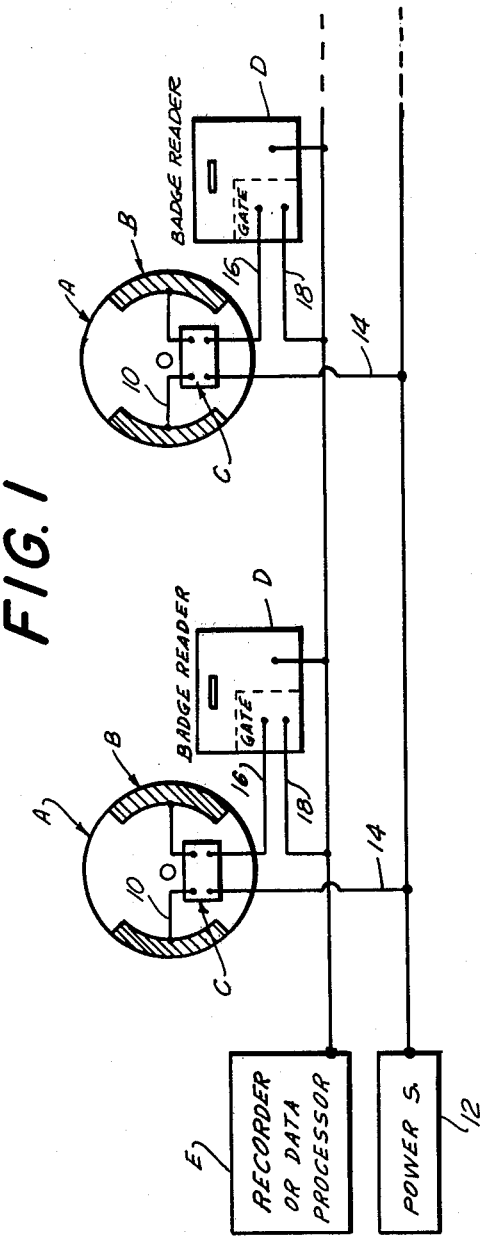
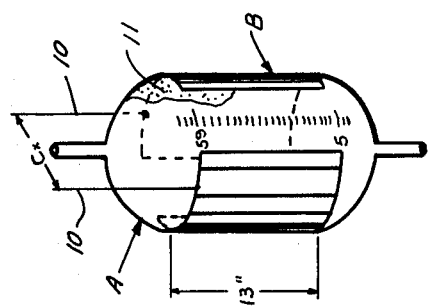

APPARATUS FOR MEASUREMENT OF QUANTITY OF LIQUID IN CONTAINER

The present invention relates to an apparatus for the instantaneous measurement and recording of the quantity of a substance contained in a vessel and, more particularly, to such an apparatus which is capable of making the necessary measurements without contaminating the substance to be measured.

The present invention is particularly suited for the measurement of the milk quantity temporarily stored in a closed glass vessel forming a part of an automatic milking machine. In this manner, a daily record of the individual milk yield of each cow on a dairy farm can automatically be obtained. For this reason, the present invention will be described in this context. However, merely because the invention is described in this context, the invention should not be construed as being limited to this application, as this device may have many applications in a variety of different fields of endeavor, as will be obvious to those skilled in the art from the following description.

It is usually not the practice on dairy farms to measure and record the daily yield of each cow on the farm, especially on large dairy farms where numerous cows are involved. Normally, milk yield for a cow is measured only occasionally. However, agricultural productivity can be enhanced significantly if the milk yield for each cow is measured and recorded on a daily basis. This data enables the farmer to take immediate steps for remeding any drop in yield, either by medication or by removing an unproductive animal.

Modern automatic milking machines are provided with glass vessels or containers in which the milk from each cow is temporarily stored prior to being transferred into a central tank. It is therefore possible to measure the milk yield for each cow by measuring the quantity of milk in the temporary storage vessel before same is transferred to the central tank.

It would, of course, be possible for the farmer to read off the quantity of milk obtained after each milking operation by the use of a scale engraved on the temporary storage vessel. However, the farmer is usually kept too busy during the milking procedure to take the reading on each glass vessel and to write down the individual results. In any case, even if the farmer had the time, an exact reading is almost impossible because of the significant amount of foam which forms on the milk's surface and conceals the actual liquid level.

Another method which could be used to measure the milk quantity in the temporary holding vessels would be to attach a weighing and recording mechanism to each one. Alternatively, one could place a liquid metering and recording apparatus into every milk line. However, both of these methods require an expensive and rather delicate apparatus which would be too costly for the average dairy farmer. Another possibility would be to install a liquid level sensing device within each of the temporary holding vessels. However, the use of any liquid level sensing device which comes into physical contact with the milk is contra-indicated because of the problems resulting from the possible contamination of the milk by the device.

It is therefore a primary object of the present invention to provide an apparatus for measuring the quantity of liquid in a container wherein no portion of the apparatus comes into physical contact with the substance to be measured such that the possibilities of contamination of the measured substance are eliminated.

It is another object of the present invention to provide an apparatus for measuring the quantity of a liquid in a container wherein the quantity measurement is taken instantaneously so as to permit continuous measurement throughout the range of the physical capacity of the vessel in which the substance to be measured is contained.

It is a further object of the present invention to provide apparatus for measuring the quantity of liquid in a container which can be utilized in conjunction with recording and/or data processing equipment such that measurements can be obtained, recorded and/or processed automatically for each individual cow on a daily basis.

It is a still further object of the present invention to provide apparatus for measuring the quantity of liquid in a container which performs the above identified objects in a simple, relatively inexpensive manner.

In accordance with the present invention, apparatus is provided for generating a signal proportional to the quantity of a substance in a container which is composed of electrically non-conducting material. The container is converted into an electrical condensor by mounting a pair of electrically isolated electrodes on the outside surface of the container, in face-to-face relationship on opposite sections thereof, such that the substance to be measured is situated therebetween. The electrodes are connected to an electronic capacitance measurement unit which senses the capacitance of the device and generates an output signal proportional to the sensed capacitance.

Preferably, the electrodes take the form of electrically conducting thin film which is affixed to the outer surface of the container, the latter normally being composed of glass. The conducting film is preferably composed of aluminum or aluminized mylar and may take the form of a conductive paint or the like.

The electrical capacitance measurement unit includes a control voltage source operatively connected to the electrodes to charge same. Preferably, a charge pump frequency to voltage converter is utilized to measure the amount of charge on the electrodes and to generate a voltage output proportional thereto.

As part of the electrical capacitance measuring unit, means are provided to calibrate the unit such that the voltage output thereof is linearly proportional to the quantity of the substance to be measured.

It is also preferable to provide a dielectric coating covering the electrodes. This coating preferably takes the form of a heat shrinkable plactic sleeve or the like. The dielectric coating serves to prevent moisture from causing a short between the electrodes, thereby preventing false quantity measurements.

To these and such other objects as may hereinafter appear, the present invention relates to apparatus for measuring the quantity of a liquid in a container, as described in the following specification and as recited in the annexed claims, taken together with the accompanying drawings, wherein like numerals were further like parts and in which:

FIG. 1 is a diagramatical view of a milk yield recording system employing the apparatus of the present invention;

FIG. 2 is a prospective view of a milk container converted for use as a part of the present invention.

Figure 3:
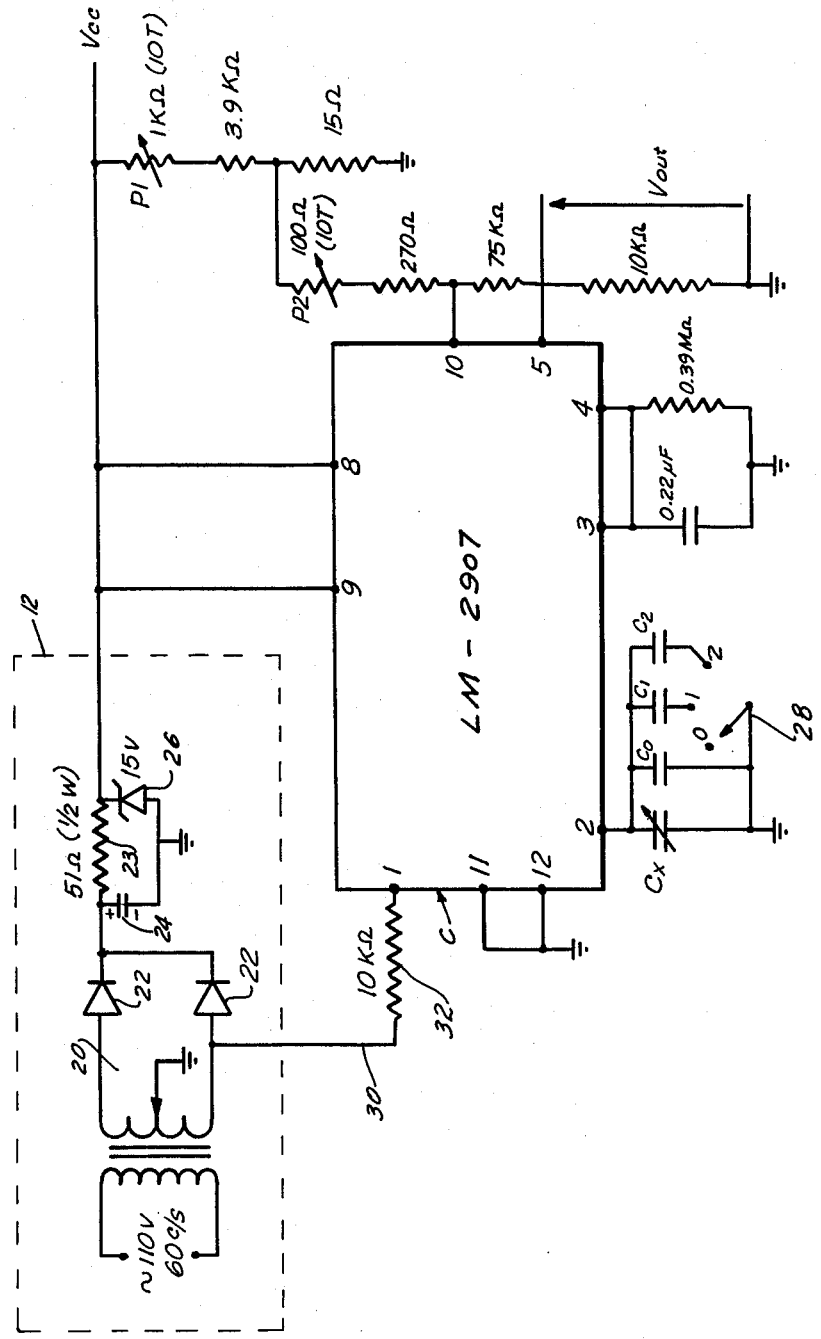
FIG. 3 is a schematic diagram of the electronic capacitance measuring unit of the present invention.

FIG. 1 diagramatically shows a plurality of milking stations including devices of the type which form the subject matter of this application. These stations, along with the appropriate identification and recording equipment, can be used to form a system which automatically measures, records and/or processes data relating to the milk yield for individual cows on a daily basis.

A vessel or container, generally designated A, the precise structure of which is described in conjunction with FIG. 2, is formed of glass or other non-conductive material in a generally cylinderical shape. Container A has affixed to the outer surface thereof a pair of electrodes, generally designated B, also described in detail below. Electrodes B are connected by means of wires 10 to the input of the electrical capacitance measurement unit, generally designated C. Units C are connected to a power source 12 by means of wire 14. The output of each measuring unit C, which appears on lead 16, is connected to the input of the gate portion of the adjacent identification apparatus, generally designated D, preferably in the form of a card or badge reader. The output of gate portion of apparatus D is connected by means of wire 18 to the input of a recording and/or data processing unit, generally designated E.

Each cow is milked in turn at one of the milking stations, usually by means of an automatic milking machine of known design. The milk output of the milking machine is temporarily stored in one of the containers A. After the milking operation has been completed, a card, badge or other identification device associated with the cow being milked is inserted into identification apparatus D. The insertion of the identification device into unit D causes the gate to close connecting the output of the electrical capacitance measuring unit C to the input of a central recorder and/or data processing unit E. In this manner, the milk yield for each cow can be recorded and/or processed on a daily basis in a completely automatic manner. After the data is recorded, the identification device is withdrawn from unit D closing the gate and the milk is conveyed to a central storage vessel.

The theory behind the construction of the apparatus of the present invention is based on the fact that the capacitance of an electrical condenser in the form of two electrically conductive plates, separated by a dielectric, is inter alia, proportional to the plate area and to the dielectric constant. In order to utilize this theory for measuring the quantity of a liquid, a vessel of non-conducting material, such as glass, is converted into an electric condenser by covering its walls on opposite sides thereof with two spaced layers or plates of a metallic or other conductive material.

As illustrated in FIG. 2, standard glass vessels used in milking machines are substantially cylinderical in shape with hemispherical tops and bottoms and have overall height of about 21 inches (530 mm) and a diameter of about 13 inches (330 mm). A pair of electrically isolated electrodes B are mounted on the outside surface of container A, in face-to-face relationship on opposite sections thereof, such that the substance to be measured (in this case milk) is situated therebetween. Preferably, the electrodes take the form of thin conductive layers which may be composed of aluminum foil, a film of aluminum mylar, conducting paint or the like. For best results, each of the electrodes should have a width of approximately one-fourth of the circumference of the container A, leaving an uncovered surface between the two layers of a similar width, that is, approximately one-quarter of the circumference of the container. In addition, the height of the electrodes should be at least equal to the cylinderical portion of the vessel. Further, it is advantageous to have the upper portion of the bottom hemisphere covered by the electrodes as well. Wire leads 10 are connected from each of the electrodes B to the input of the electronic capacitance measuring unit C.

To prevent surface leakage due to moisture, it is preferable to coat the entire surface of the vessel, including the electrodes, with a suitable insulating material 11. This insulating or dielectric coating may preferably take the form of a heat-shrinkable plastic sleeve or the like.

The capacitance of a container formed as described above will vary from a minimum, coinciding with the state of an empty container when the space between the conductive layers is occupied by air, to a maximum, when the container is completely filled with the substance to be measured, in this case milk. Since the dielectric constant of milk is about 80 times as great as the dielectric constant of air, the capacitance of the empty container has a very small value and the capacitance will increase in proportion to the height of the liquid level. Thus, the capacitance is a function of the milk yield of the cow as indicated by the liquid level in the container. It should be appreciated that since foam has a dielectric constant similar to that of air, the presence thereof does not significantly increase the capacitance. Therefore, the apparatus will always indicate the true quantity of the liquid, regardless of the amount of foam which is present within the container.

With a container of standard size, as set forth above, it is preferable that each of the electrodes B measure approximately 10 inches wide by 13 inches high. These dimensions are given by way of example only and deviations therefrom are possible without considerable detriment to the measuring properties of the apparatus. However, these dimensions have shown themselves advantageous as compared with electrodes of other sizes.

FIG. 3 shows a diagram of the power source 12, and electonic capacitance measuring unit C. Power supply 12 is designed to generate a voltage of 15 volts±0.5 with a stability of 0.1%. The power supply consists of a transformer 20, the output of which is connected, by means of diodes 22, to a filter circuit comprising resistor 23, capacitor 24 and a Zener diode 25.

Power supply 12 drives a charge pump frequency to voltage converter circuit which is contained within a 14 pin integrated circuit chip of the type which is commercially available from the National SemiConductor Company under the designation LM-2907. Transformer 20 is connected to pin 1 by means of lead 30 and a 10 KΩ resistor 32 to provide power for the chip. Vcc is supplied to the chip from the output of filter 23 and is in this example 15±0.5 v. The capacitance to be measured $C_x$ is connected to the input at pin #2 along with calibration capacitors $C_0$, $C_1$ and $C_2$ and switch 28. The first stage of the chip comprises a differential amplifier connected between the output of transformed 20 on lead 30 and ground. The output of the amplifier drives a charge pump where the input frequency from the amplifier output is converted into a dc voltage which appears at pin #2. Thus, when the input stage changes state due to the differential voltage output, the capacitor $C_x$ is either charged or discharged linearly between two voltages whose difference is Vcc/2 or 7.5 volts. The output circuit mirrors the average current (change in charge on the capacitor per time interval) into a lead resistor 34, such that if the pulses of current are integrated with a filter capacitor 36, then the output voltage, which appears across resistor 38, is proportional to the capacitance of $C_x$. The output voltage is developed by means of an operational amplifier which forms the second stage of the chip.

Each of the circuits has to be calibrated individually because the calibration depends upon the exact dimensions of the container, the location of each of the electrodes B thereon, and the length and configuration of the connecting leads 10, as well as the real values of the electrical components and numerous other physical and electrical properties. However, initial calibration of the device need only be performed once, at the time at which the container is converted for use in the present invention.

The first step in the initial calibration process is to find the value of $C_o$. This is done by using a conventional capacitance bridge (not shown). With the bridge, the value of $(C_x)_{min}$, the capacity of the system, when the container is empty, is obtained. The value of $C_o$ is calculated in accordance with the following equation:

$$C_o = 120\ pF - (C_x)_{min}$$

$C_o$ is expected to be in the interval 30–80 pF. The accuracy of $C_o$ should be obtained to approximately $\pm 5$ pF.

Next, the value of $C_1$ is obtained. Using the same bridge, find $(C_x)_8$, which represents the value of $C_x$ when there is exactly eight pounds of milk in the container. Then, $C_1$ can be calculated from the following equation:

$$C_1 = (C_x)_8 - [(C_x)_{min} + C_o]$$

It is important to take a real value at $[(C_x)_{min} + C_o]$, which may differ by 5 pF from 120 pF. The expected value of $C_1$ is about 30 pF. The accuracy of $C_1$ should be obtained to $\pm 2$ pF.

Next, the value of $C_2$ is obtained. This is accomplished by measuring the value of $(C_x)_{30}$, the value of $C_x$ when there is exactly 30 pounds of milk in the container. $C_2$ is calculated from the following equation:

$$C_2 = (C_x)_{30} - [(C_x)_{min} + C_o]$$

Again, it is important to use the real value of the bracketed expression. The expected value of $C_2$ is approximately 140 pF and the accuracy of $C_2$ should be $\pm 2$ pF.

Once the values of $C_o$, $C_1$ and $C_2$ have been determined, capacitors of these values are utilized in the circuit in conjunction with switch 28 as shown in FIG. 3. Thereafter, only a routine calibration procedure, to be performed periodically, need be utilized. With the container empty, switch 28 is put in position 2. Using potentiometer $P_2$, the output voltage $V_{out}$ is regulated to the value 9.0 volts. Switch 28 is then put in position 1. Using potentiometer $P_1$, the output voltage $V_{out}$ is regulated to the value of 2.4 volts. The above steps are repeated until the values of $V_{out}$ at switch positions 1 and 2 are $2.4 \pm 0.05$ and $9.0 \pm 0.05$ volts, respectively. The measuring unit can now be utilized and the output $V_{out}$ thereof will be linearly proportional to the quantity of milk within container A.

As can now be readily appreciated, the present invention is an apparatus for generating a signal proportional to the quantity of a substance in a container. The apparatus is capable of measuring the quantity of the substance without physical contact therewith and, thus, measurements can be made without the possibility of contamination of the substance, a particularly advantageous feature when milk yields are being measured. Further, the apparatus of the present invention can be utilized in conjunction with conventional identification units and recorder and/or data processing equipment in order to measure, record and/or process data relating to milk yields of a large number of different cows on a diary farm. Moreover, the advantageous features of the present invention are accomplished through the use of relatively simple, inexpensive and virtually maintenance-free equipment.

While only a single embodiment of the present invention has been disclosed herein for purposes of illustration, it is obvious that many modifications and variations could be made thereto. It is intended to cover all of these modifications and variations which fall within the scope of the present invention as defined by the annexed claims.

I claim:

1. Apparatus for generating a signal proportional to the quantity of the substance in a container composed of electrically non-conducting material, the apparatus comprising a pair of electrically isolated electrodes, mounted on the outside surface of the container, in face-to-face relationship on opposite sections thereof, such that the substance to be measured is situated therebetween, a dielectric coating covering said electrodes, and means, operatively connected to said electrodes, for measuring the capacitance of said electrodes and for generating an output signal proportional to said measured capacitance.

2. The apparatus of claim 1 wherein said electrodes are formed of electrically conducting film.

3. The apparatus of claim 2 wherein said film is conductive paint.

4. The apparatus of claim 2 wherein said film is aluminum foil.

5. The apparatus of claim 2 wherein said film is comprised of aluminized mylar.

6. The apparatus of claim 1 wherein said signal generating means comprises a controlled voltage source and means for intermittently pumping current into said electrodes to charge and discharge same.

7. The apparatus of claim 6 wherein said signal generating means further comprises means for averaging the amount of charge pumped into the electrodes and means for generating a voltage output proportional thereto.

8. The apparatus of claim 7 wherein said signal generating means further comprises calibration means for adjusting said voltage output to be linearly proportional to the quantity of the substance within the container.

9. The apparatus of claim 1, wherein said signal generating means further comprises calibration means for calibrating said signal generating means such that said output signal is linearly proportional to the quantity of substance in the container.

10. The apparatus of claim 1 wherein said signal generating means comprises a charge pump frequency to voltage converter.

11. The apparatus of claim 10, wherein said signal generating means further comprises calibration means for calibrating said signal generating means such that said output signal is linearly proportional to the quantity of substance in the container.

12. The apparatus of claim 1 wherein said coating is a plastic sleeve.

13. The apparatus of claim 1 wherein said container has a substantially cylindrical portion and wherein said sections are located on said cylindrical portion.

14. The apparatus of claim 13 wherein said substance is a liquid and wherein said container is a closed vessel comprising liquid input and output ports.

15. The apparatus of claim 1 wherein said substance is milk.

* * * * *